Dec. 29, 1964     T. E. HUHTALA     3,163,469
BRAKE ANTI-SQUEAL MECHANISM
Filed Nov. 13, 1962
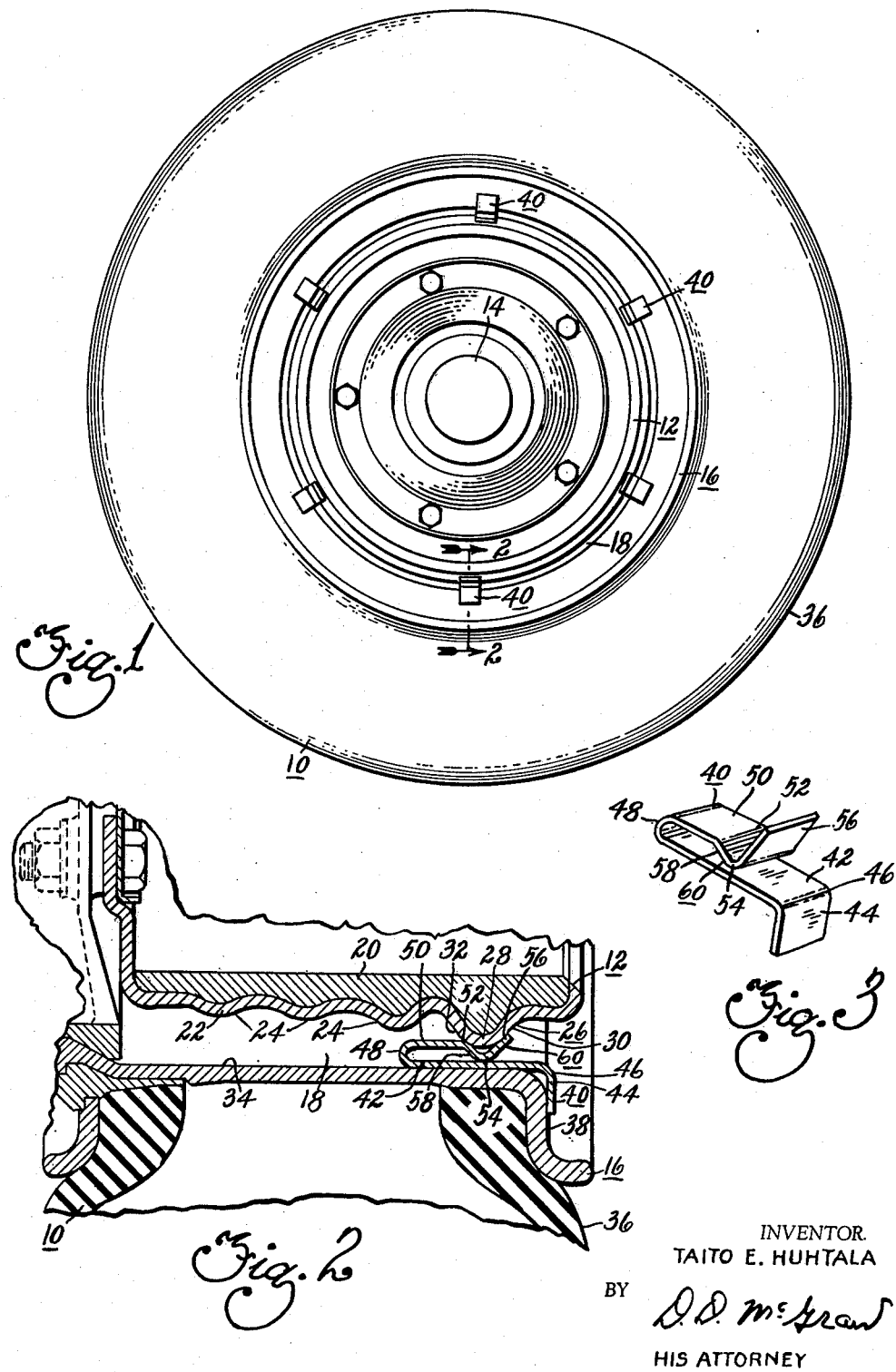
INVENTOR.
TAITO E. HUHTALA
BY
D. D. McGraw
HIS ATTORNEY 
3,163,469
BRAKE ANTI-SQUEAL MECHANISM
Taito E. Huhtala, Union Lake, Mich., assignor to General Motors Corporation, Detroit, Mich., a corporation of Delaware
Filed Nov. 13, 1962, Ser. No. 236,976
2 Claims. (Cl. 301—6)

The invention relates to mechanism for reducing the squeal noises generated in a wheel assembly when the brakes are applied. Brake squeal noises reach particularly objectionable levels in wheels such as that utilized on trucks and other large vehicles wherein the brake drum is received radially inward of a wheel rim and spaced therefrom. Since the drum is not directly attached to the wheel rim it has a bell effect and is subjected to vibrations when the brakes are applied which generate noises within the audible range. The invention includes the provision of one or more spring clips which resiliently engage the drum and the wheel rim and operate to damp out brake squeal noises. Depending upon the particular wheel and drum configuration installation, any suitable number of clips may be utilized. In some installations it is desirable to randomly space the clips circumferentially and in others it may be desirable to space some or all of the clips equally. Each clip is preferably formed so as to have surface contact with one part of the wheel assembly and line contact with another part of the wheel assembly. It is preferred that the line contact be with the wheel drum in order to reduce to a minimum the amount of heat transfer from the drum to the spring by conduction. By keeping the heat transfer to a minimum the spring characteristics of the clip are more easily maintained. Each clip is also so constructed as to be resiliently locked in position.

In the drawing:
FIGURE 1 is a side elevation of a wheel assembly illustrating the installation of a plurality of spring clips.
FIGURE 2 is a cross section with parts broken away and taken in the direction of arrows 2—2 of FIGURE 1.
FIGURE 3 is a perspective view of one of the spring clips of FIGURE 1.

The wheel assembly 10 includes a brake drum 12 suitably mounted on an axle 14 and having a wheel rim 16 secured thereto. Rim 16 extends circumferentially about and is radially spaced from the drum 12, as is common in wheel assemblies for trucks and other large vehicles. This construction leaves an annular space 18 between the drum and the rim.

The drum 12 has a friction inner surface 20 which is suitably engaged by brake shoes in order to apply a braking force to the wheel assembly 10. The drum also has an outer surface 22. This surface may be provided with a series of circumferentially extending and axially spaced undulations 24, the outer one 26 being described in further detail. Undulation 26 has a crown 28 and reversely sloping sides 30 and 32, with the crown extending radially outward from the remainder of the drum so that it is adjacent but spaced from the rim 16. The rim 16 is provided with an inner surface 34 which is preferably flat as seen in cross section in FIGURE 2. The rim includes suitable structure for holding the tire 36 in place. This structure may include a bead 38 which extends substantially at right angles from the rim inner surface 34 and radially outward on the outer side of the wheel assembly.

The spring clips 40 of FIGURE 1 are illustrated in detail in FIGURES 2 and 3. Only one of the clips will be further described in detail. Clip 40 includes a flat body section 42 with the end 44 thereof being bent at 46 at approximately right angles so as to provide a clip positioning stop when the clip is installed. Flat body section 42 is reversely bent at 48 to provide a flat portion 50 extending substantially parallel to flat section 42. The clip is also bent at 52 toward flat section 42 and then is bent at 54 in the other direction to provide an end portion 56 extending angularly away from flat section 42. Bends 52 and 54 are connected by one side 58 of a V section 60 formed by bend 54, side 58 and end portion 56.

Wheel assemblies constructed in the manner shown in FIGURES 1 and 2, but without the use of spring clips 40, generate objectionable squeal noises when the brakes are applied. One or more spring clips 40 are inserted in the space 18 to reduce or eliminate such noises. Each spring clip is inserted so that the flat section 42 is in surface area engagement with the inner surface 34 of rim 16 and the end 44 is in engagement with the bead 38 to position the clip. At the same time the V section 60 of the clip has its sides 56 and 58 in line engagement with the slopes 30 and 32 of undulation 26 so that the resilient return bend 48 of the spring biases the clip tightly into engagement with the drum and the rim. The engagement of the V section 60 with the undulation 26 also provides a lock which holds the spring in position. The line contact between the spring and the brake drum minimizes the transfer of heat by conduction from the drum to the spring, thus having a minimum heat effect on the spring and the rim 16. Under some circumstances it may be desirable to reverse the surface engagement and line contact engagement arrangement due to peculiarities of construction of some types of drums and rims.

One spring clip 40 may be utilized in some instances. However, it is desirable to use a plurality of such clips. In the usual wheel assembly, the spring clips may be randomly spaced circumferentially. However, in some wheel assemblies it may be desirable to space some or all of them equally about the drum 12.

Mechanism has been provided which reduces the brake squeal noises in a wheel assembly. The mechanism may be readily installed and removed without special tools, and may be rearranged as desired. In addition to damping the brake noises the spring means utilized in the assembly will allow road deflection of the rim with respect to the drum.

In the claims:
1. A brake anti-squeal assembly comprising in combination, a wheel including an annular brake drum having an outer surface and a friction inner surface and a rim secured to said wheel in annular spaced relation about said drum and having an inner surface spaced radially outward from said drum outer surface, and noise damping spring means resiliently engaging said drum outer surface and said wheel inner surface for damping brake squeal noises and secured between said surfaces only by the resilient engagement therewith, said drum outer surface having an undulation including oppositely sloped sides and a crown extending toward said rim inner surface, said spring means having a V section fitting over said undulation crown and in line engagement with said oppositely sloping sides to provide a heat conducting block substantially preventing heat transfer by conduction from said drum to said spring means.

2. A brake anti-squeal assembly comprising in combination, a wheel including an annular brake drum having an outer surface and a friction inner surface and a rim secured to said wheel in annular spaced relation about said drum and having an inner surface spaced radially outward from said drum outer surface, and noise damping spring means resiliently engaging said drum outer surface and said wheel inner surface for damping brake squeal noises and secured between said surfaces only by the resilient engagement therewith, said spring means having a first section in surface area engagement with said rim and a second section resiliently joined with said first section and in line engagement with said drum providing a conductive heat block between said drum and said spring means.

References Cited in the file of this patent
UNITED STATES PATENTS

| | | |
|---|---|---|
| 2,197,583 | Koeppen | Apr. 16, 1940 |
| 2,818,304 | Horn | Dec. 31, 1957 |
| 2,962,324 | Swanberg | Nov. 29, 1960 |

OTHER REFERENCES

American Transit Association Report, N.Y., September 1949. Progress Report on Elimination of Brake Noise (6 pages).